US005801379A

United States Patent [19]

Kouznetsov

[11] Patent Number: 5,801,379

[45] Date of Patent: Sep. 1, 1998

[54] HIGH VOLTAGE WAVEFORM GENERATOR

[75] Inventor: Viktor Kouznetsov, Mars, Pa.

[73] Assignee: Mine Safety Appliances Company, Pittsburgh, Pa.

[21] Appl. No.: 609,531

[22] Filed: Mar. 1, 1996

[51] Int. Cl.$^6$ ............................ H01J 49/00; B01D 59/44

[52] U.S. Cl. ............................ 250/286

[58] Field of Search ............................ 250/281, 286, 250/287

[56] References Cited

U.S. PATENT DOCUMENTS

| | | | |
|---|---|---|---|
| 2,786,946 | 3/1957 | Nisle | 250/286 |
| 3,809,896 | 5/1974 | Schuy et al. | 250/286 |
| 3,910,074 | 10/1975 | Parker | 66/157 |
| 3,945,242 | 3/1976 | Ulyanov et al. | 73/15.4 |
| 4,181,852 | 1/1980 | Berthod | 250/286 |
| 4,458,149 | 7/1984 | Muga | 250/286 |
| 4,637,265 | 1/1987 | Fiori | 73/862.33 |
| 4,777,412 | 10/1988 | Leonardi | 315/371 |
| 5,420,424 | 5/1995 | Carnahan et al. | 250/287 |

*Primary Examiner*—Bruce Anderson
*Attorney, Agent, or Firm*—Titus & McConomy

[57] ABSTRACT

Generally, the present invention provides a high voltage waveform generator for use in an ion mobility spectrometer (IMS) that detects trace concentration level ionic species present in a sample gas stream. The present invention consists of a first electromagnetic transformer having a pair of oscillating circuits that are simultaneously excited by a transformer input winding controlled by a controller such as a power semiconductor device. Each oscillating circuit in the pair includes inductive and capacitive components that generate discrete frequency waveforms corresponding to the fundamental and second Fourier harmonic frequencies of an electric signal that approximates an ideal square wave used in creating a transverse electrical field for transport of ion species through an ion mobility spectrometer. The oscillating circuits are electromagnetically coupled to each other. The extent of this electromagnetic coupling can be varied by an inductance juxtapositioned to the first transformer so as to vary the magnetic field coupling the oscillating circuits. The amount of electromagnetic coupling is adjusted by a phase correction circuit to eliminate phase differences between the fundamental and second Fourier harmonic frequencies to ensure that the electrical signal generated by the present invention is as close an approximation of the ideal square voltage waveform as possible. The amplitudes of the fundamental and second Fourier harmonic frequency components of the output waveform are also adjusted by an amplitude correction circuit in such a way as to maintain a constant ratio between them to ensure that the output waveform is correctly shaped for use in the ion mobility spectrometer.

20 Claims, 5 Drawing Sheets

HIGH VOLTAGE WAVEFORM GENERATOR

FIELD OF THE INVENTION

The present invention relates to a high voltage waveform generator for use in generating a periodically varying electrical signal to create a periodically varying high voltage electrical field in a field ion mobility spectrometer.

BACKGROUND OF THE INVENTION

Field ion spectrometry (FIS) offers a new method of detecting species present at trace (parts per million to parts per billion) concentration levels in a sample gas to be analyzed. U.S. Pat. No. 5,420,424, incorporated by reference herein, provides an ion mobility spectrometer (IMS) for use in detecting trace concentration level species present in a sample gas stream. The IMS disclosed in U.S. Pat. No. 5,420,424 utilizes periodic high voltage electrical fields to separate different species of ions according to the functional dependence of their mobility with electric field strength. Ions generated in the ionization chamber of the IMS are guided through an ion filter to an ion detector by an asymmetric periodic radio frequency (RF) electric field known as the "dispersion voltage" that is created between a pair of closely spaced longitudinal electrodes located across the ion filter. The displacement of the ions induced by the dispersion voltage is modified or compensated by an adjustable second time independent electrical potential that is applied between the electrodes to isolate a particular ion species for detection as a result of the variance in mobility between particular ion species as a function of electric field strength.

The dispersion voltage waveform must be sufficiently high so that the electric field created in the IMS will cause the ion mobility values of the species selected for analysis to deviate significantly from their low electric field values. For electrode spacing on the order of 1 to 3 millimeters, this requires a dispersion voltage waveform with peak values in the 1 to 6 kilovolt (kV) range. The optimum dispersion voltage waveform for obtaining the maximum possible ion detection sensitivity on a per cycle basis takes the shape of an asymmetric square wave with a zero time-averaged value. The power consumption of a conventional electrical waveform generator in generating this type of voltage waveform is in excess of 100 watts. The generation of asymmetric periodic high voltage waveforms is discussed in *The International Journal of Mass Spectrometry and Ion Processes*, Vol. 128. pp. 143–148 (1993); in Russian Inventor's Certificate No. 966583; in Devices and Techniques of Experiment, Vol. 4, pp. 114–115 (1994); and in *Proceedings: Fourth International Workshop on Ion Mobility Spectrometry*, Aug. 6–9, 1995.

In order to reduce the power consumption requirements to a level that will allow the incorporation of a high voltage waveform generator into a portable IMS, it has become necessary to design a waveform generator circuit using inductive and capacitive components to produce an output voltage waveform that permits input energy storage and recirculation in the inductive and capacitive components of the circuit. The present invention provides such a waveform generator which produces an output voltage waveform that is a two harmonic Fourier series approximation of the ideal dispersion voltage square waveform discussed above. In addition, the present invention utilizes a unique configuration for the relative physical positioning of the inductive components in the circuit that gives rise to a unique dual discrete frequency waveform that approximates the ideal dispersion voltage waveform as closely as possible. Finally, the invention provides circuitry which ensures phase and amplitude stabilization of this dual discrete frequency output voltage waveform.

Accordingly, the present invention provides a high voltage waveform generator that uses inductive and capacitive components to produce an oscillating output voltage.

Preferably, the high voltage waveform generator permits input energy storage and recirculation in the inductive and capacitive components of the circuit so as to produce an output voltage waveform that is a two harmonic Fourier series approximation of an ideal asymmetric periodic high voltage square waveformn.

The present invention also preferably provides a unique physical configuration for the positioning of the inductive components in the circuit which gives rise to the dual discrete frequencies of the output voltage waveform.

The present invention also preferably provides circuitry which ensures phase and amplitude stabilization of the output voltage waveform.

SUMMARY OF THE INVENTION

Generally, the present invention provides a high voltage waveform generator for use in an ion mobility spectrometer (IMS) that detects trace concentration level species present in a sample gas stream. The present invention consists of a first electromagnetic transformer having a pair of oscillating circuits that are simultaneously excited by a transformer input winding controlled by a controller such as a power semiconductor device. Each oscillating circuit in the pair includes inductive and capacitive components that generate discrete frequency waveforms corresponding to the fundamental and second Fourier harmonic frequencies of an electric signal that approximates an ideal square wave used in creating a transverse electrical field for transport of ion species through an ion mobility spectrometer. The oscillating circuits are electromagnetically coupled to each other. The extent of this electromagnetic coupling can be varied by an inductance juxtapositioned to the first transformer so as to vary the magnetic field coupling the oscillating circuits. The amount of electromagnetic coupling is adjusted by a phase correction circuit to eliminate phase differences between the fundamental and second Fourier harmonic frequencies to ensure that the electrical signal generated by the present invention is as close an approximation of the ideal square voltage waveform as possible. The amplitudes of the fundamental and second Fourier harmonic frequency components of the output waveform are also adjusted by an amplitude correction circuit in such a way as to maintain a constant ratio between them to ensure that the output waveform is correctly shaped for use in the ion mobility spectrometer.

Other details, objects, and advantages of the present invention will become apparent in the following description of the presently preferred embodiment.

BRIEF DESCRIPTION OF THE DRAWINGS

In the accompanying drawings, the preferred embodiments of the present invention and preferred methods of practicing the present invention are illustrated wherein.

DETAILED DESCRIPTION OF THE PREFERRED EMBODIMENT

Figure 1:
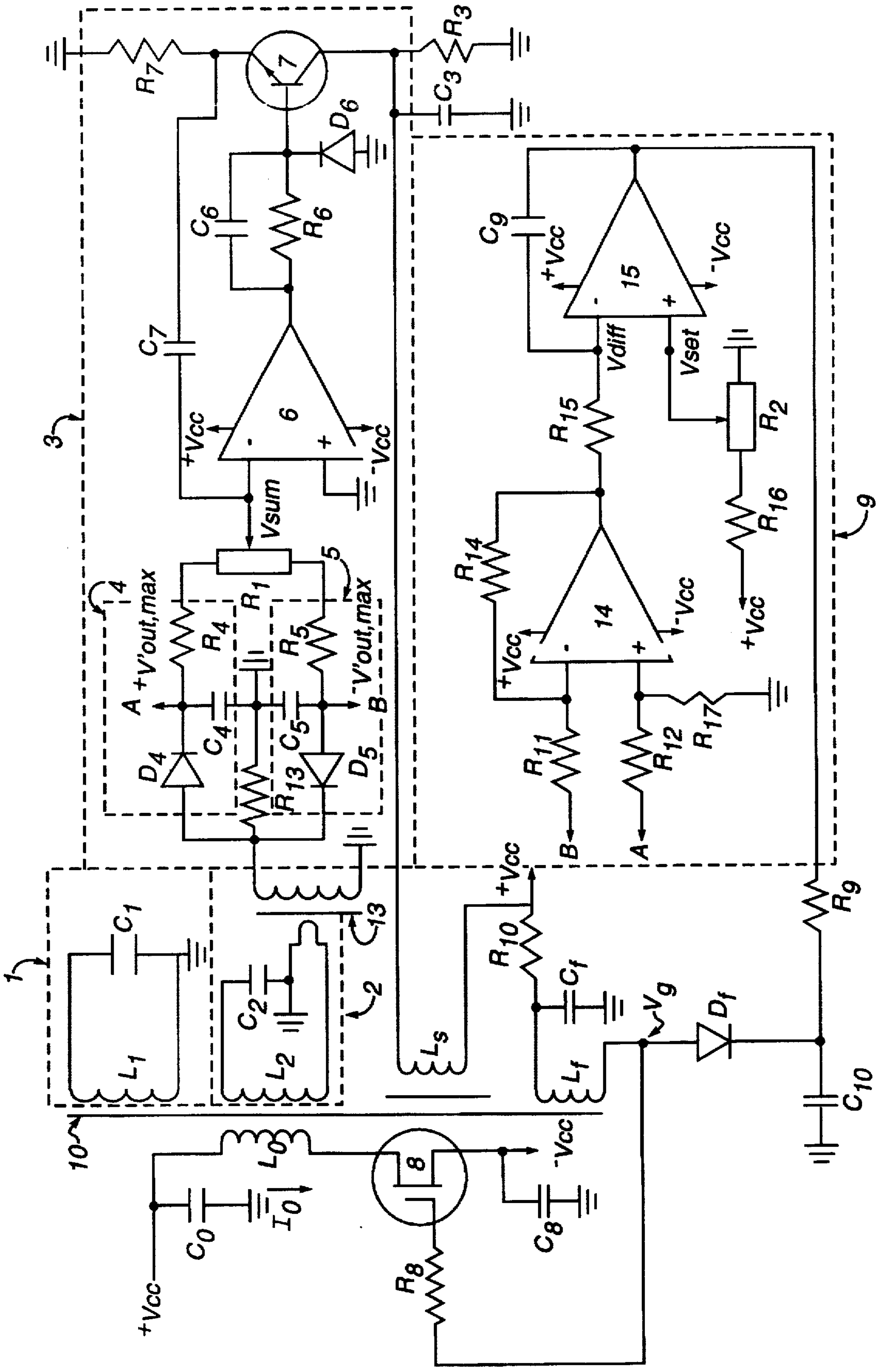
FIG. 1 is an electrical schematic drawing of a preferred embodiment of high voltage waveform generator of the present invention.

FIG. 1 shows a schematic electrical circuit diagram of a preferred embodiment of the present invention. The circuit shown in FIG. 1 preferably generates a radio frequency (RF) electrical voltage signal output corresponding to the periodic waveform Vout(t) shown in FIG. 2B across the first and second electrodes 21 and 22 of the ion mobility spectrometer described in U.S. Pat. No. 5,420,424, which is incorporated by reference herein and shown in FIG. 3. This output voltage signal Vout(t) is the periodic asymmetric potential referred to in U.S. Pat. No. 5,420,424, and it creates a periodically varying electric field across the electrical capacitance formed by electrodes 21 and 22 which guides an ion species across the analytical gap 25 from the ionization chamber 28 to the ion detector 40. The preferred range of output voltages generated by the circuit of FIG. 1 is 1 (one) to 6 (six) kilovolts (kV).

Figure 2A:
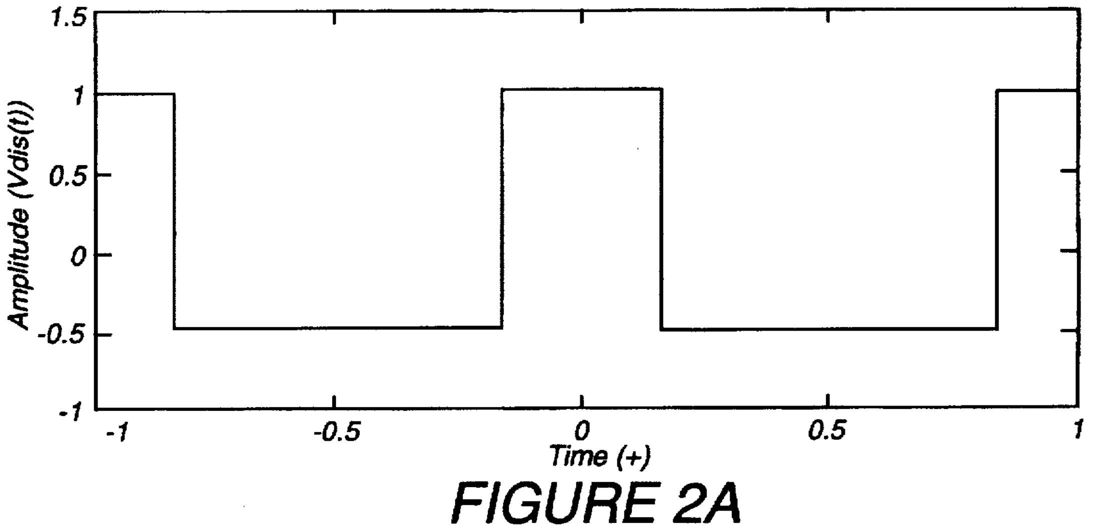
FIG. 2A is a graph of the ideal dispersion voltage waveform used in creating a transverse electric field in an ion mobility spectrometer.
Figure 2B:
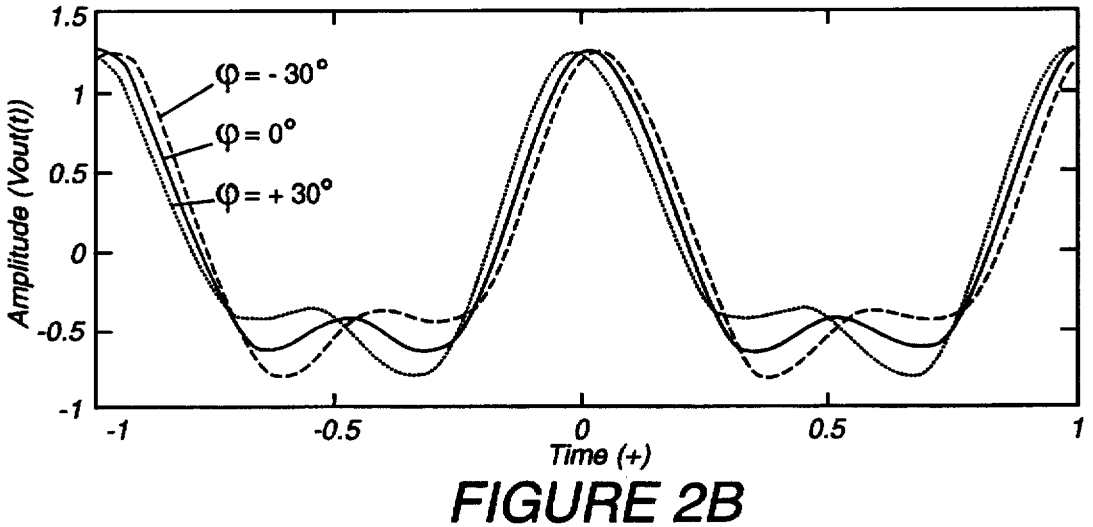
FIG. 2B is a graph of the output voltage waveform produced by a preferred embodiment of the present invention.
Figure 3:
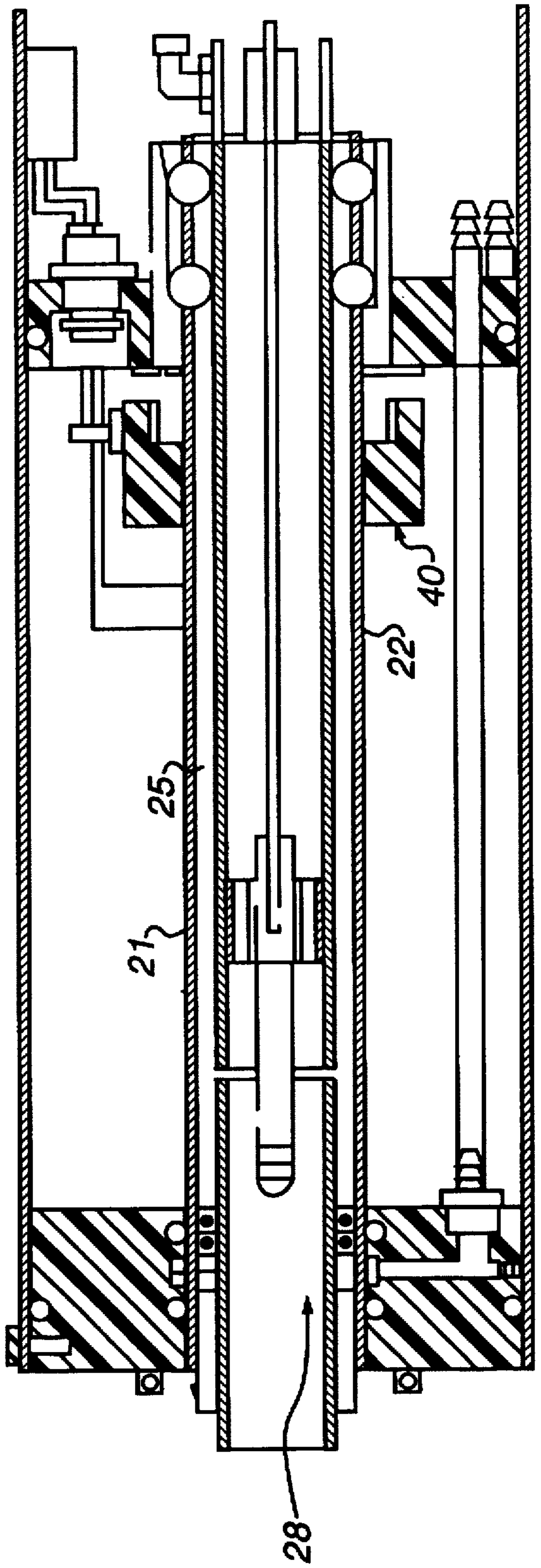
FIG. 3 is a schematic diagram of an ion mobility spectrometer into which a preferred embodiment of the present invention is incorporated.

The output voltage waveform Vout(t) shown in FIG. 2B is the fundamental and second harmonic Fourier series approximation of the ideal dispersion voltage wavefom Vdis(t) shown in FIG. 2A. The ideal dispersion voltage waveform Vdis(t) represents the optimum shape of the periodic asymmetric potential applied across electrodes 21 and 22 for obtaining the maximum possible detection sensitivity of an ion species by the ion detector 40. This ideal dispersion voltage waveform Vdis(t) can be expressed mathematically by the following characteristics:

$$\text{a periodic time function: } Vdis(t) = Vdis(t+T) \qquad \text{a)}$$

$$\text{zero time-averaged value: } \int_O^T Vdis(t)dt = 0 \qquad \text{b)}$$

$$\text{an asymmetric shape: } \int_O^T (Vdis(t))^{2N+1}dt \neq 0,\ N = 1, 2, \text{etc.} \qquad \text{c)}$$

Due to the large input power requirements for generating the ideal dispersion voltage waveform Vdis(t) shown in FIG. 2A, its shape is approximated by the two harmonic Fourier series output voltage waveform Vout(t) in a preferred embodiment of the present invention. Vout(t) permits input energy storage and recirculation in the inductive and capacitive components of the circuit of FIG. 1, drastically reducing the input power requirements for generating the desired dispersion voltage. The output voltage waveform Vout(t) as shown in FIG. 2B can be characterized by the combination of two component waveforms with discrete frequencies that obey the following mathematical expression:

$$Vout(t) = Vfund,max(\cos(wt)) + Vharm,max(\cos(2wt+\phi)) \qquad (1)$$

with a) a fundamental frequency component w having maximum amplitude Vfund,max b) a second harmonic frequency component 2w having maximum amplitude Vharm,max c) a phase difference Ø between the fundamental and second harmonic frequency components The fundamental frequency w and second harmonic frequency 2w of the output voltage waveform Vout(t) are respectively set by the electrical inductance and capacitance combinations L1/C1 and L2/C2 in the circuit of FIG. 1. These inductance/capacitance combinations are preferably series circuit connections that form "tank circuits" 1 and 2 that are electromagnetically coupled by a principal transformer 10 into a pair of dual resonance oscillation circuits that each simultaneously resonate at the frequencies given in Equation (1). The entire output voltage waveform Vout(t) appears across each Inductance L1 and L2 while capacitance C1 represents the capacitance formed by electrodes 21 and 22 in the ion mobility spectrometer of FIG. 3. Thus, the output voltage waveform Vout(t) is applied across electrodes 21 and 22 by the voltage created across inductance L1 to operate the ion mobility spectrometer. Inductance/capacitance combination L2/C2 applies the output voltage waveform Vout(t) to control circuits that adjust for phase and amplitude variations in the waveform as described below. The output voltage waveform Vout(t) fundamental and second harmonic frequencies w and 2w, respectively, are set according to the following expressions:

$$w=[(w1^2+w2^2-((w1^2+w2^2)^2-4w1^2w2^2(1-k^2))^{1/2})/2(1-k^2)\ ]^{1/2} \qquad (2)$$

$$2w=[(w1^2+w2^2+((w1^2+w2^2)^2-4w1^2w2^2(1-k^2))^{1/2})/2(1-k^2)]^{1/2} \qquad (2)$$

where:

$w1=1/[L1*C1]^{1/2}$ $w2=1/[L2*C2]^{1/2}$

Figure 4:
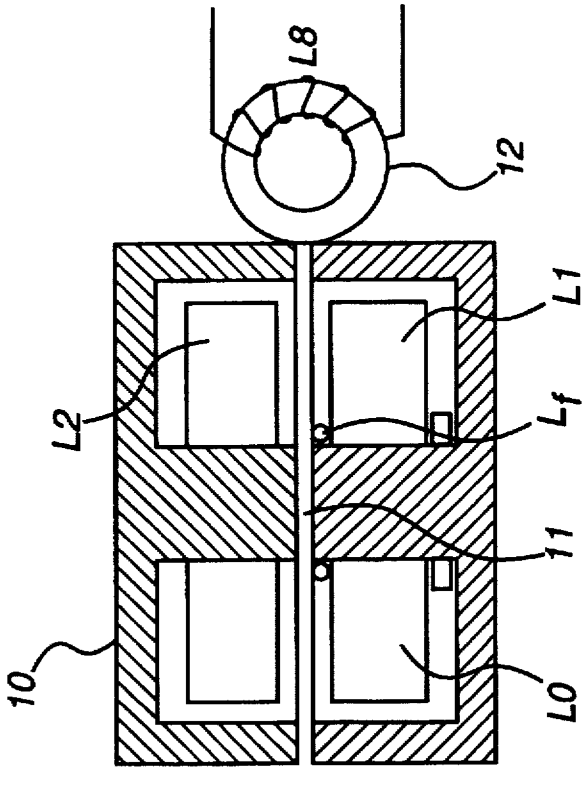
FIG. 4 is an elevation view of the principal transformer utilized in a preferred embodiment of the present invention.

As shown in FIG. 4, the tank circuits 1 and 2 are preferably located in separate sections of a principal transformer 10, preferably torodially shaped, which forms an electromagnetic coupling between the tank circuits 1 and 2 that can be characterized by a coupling coefficient k. Principal transformer 10 preferably has a pot core made of any conventional ferrimagnetic material, such as the material 3F3, with a gap 11 to separate the sections housing the respective tank circuits 1 and 2. The coupling coefficient k is initially set by the physical positioning of excitation inductance L0 in relation to L1 and L2 inside the principal transformer 10 housing as shown in FIG. 4. The ideal physical positioning of L0 relative to L1 and L2 is so as to generate the dual discrete fundamental frequency w and second harmonic frequency 2w waveforms, where w and 2w are given by Equations (2) and (2*a*), respectively. If L0 is positioned equidistant from L1 and L2, only w will be generated. A difference in the relative positioning of L0 with respect to L1 and L2, respectively, will generate the dual discrete frequencies given by Equations (2) and (2*a*). The extent of electromagnetic coupling k between tank circuits 1 and 2 also determines the amount of phase difference Ø existing between the fundamental and second harmonic waveforms w and 2w, respectively. This phase shift elimination is determined from Equations (2) and (2*a*) to occur at a coupling coefficient value k=0.6. A coupling coefficient k of 0.6 ensures the closest possible approximation of Vout(t) to the optimum dispersion voltage waveform Vdis(t).

Variations in the ambient temperature and self-heating of circuit components tend to shift the values of the inductances and thus the extent of electromagnetic coupling k between the tank circuits 1 and 2 as the circuit is operated. This in turn will give rise to a phase difference Ø between the fundamental frequency w and second harmonic 2w frequency waveforms making up the output voltage waveform Vout(t). The elimination of this phase difference Ø is critical to the proper approximation of the ideal dispersion voltage waveform Vdis(t) shown in FIG. 2A by the output voltage waveform Vout(t) shown in FIG. 2B. As shown in FIGS. 1 and 4, a separate inductive coil 12 surrounding a ferrimagnetic material is preferably provided with a feedback inductance of value Ls that adjusts (or "fine tunes") the extent of electromagnetic coupling k between L1 and L2. This feedback inductor 12 has a flat surface that is positioned next to principal transformer 10 such that the center of feedback inductor 12 is aligned with the center of the gap 11 in principal transformer 10. The amount of current through feedback inductance Ls is adjusted to "fine tune" the coupling coefficient k between L1 and L2 to eliminate any phase difference Ø created between the fundamental frequency w and second harmonic frequency 2w waveforms during operation of the circuit.

The amount of current through feedback inductance Ls is preferably controlled by the phase correction circuit 3 shown in FIG. 1. Vout(t) is input to the phase correction circuit 3 through a current transformer 13 which can be connected in series with the inductance/capacitance combination of either tank circuit 1 or 2. In FIG. 1, the current transformer 13 is connected in series to inductance/capacitance combination L2/C2 in tank circuit 2. Reflecting the current flowing through tank circuit 2 through current transformer 13 produces a signal V'out(t), shown in FIG. 2C, which has a maximum amplitude V'out,max at the points where the output voltage signal Vout(t) is changing at a maximum rate.

Figure 2C:
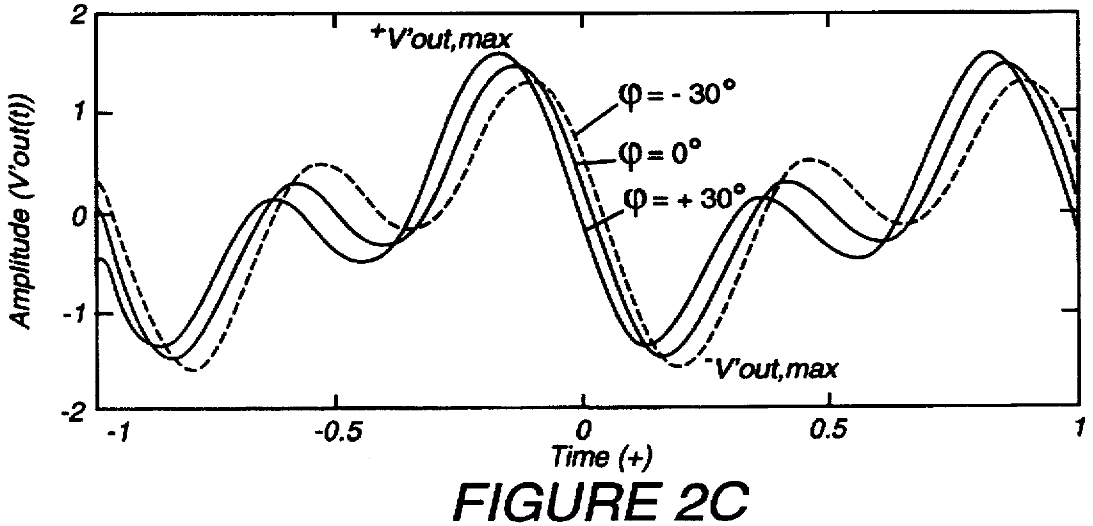
FIG. 2C is a graph of the output voltage waveform as converted for input to the phase correction circuit of a preferred embodiment of the present invention.

Referring to FIGS. 1 and 2C, the current transformer 13 electromagnetically couples V'out(t) to a pair of peak detector circuits 4 and 5 which detect the peak magnitudes of V'out(t) as it oscillates between opposite polarity maximum and minimum points. Each peak detector circuit 4 or 5 is respectively comprised of a diode D4 or D5 in combination with a commonly grounded charging capacitor C4 or C5. Diode D4 or D5 acts as a gate to allow charging of its respective capacitor C4 or C5 during successive opposite polarities of V'out(t). The accumulated charge on capacitor C4 will thus be proportional to the maximum positive amplitude of V'out(t)=+V'out,max while the accumulated charge on capacitor C5 will be proportional to the maximum negative amplitude of V'out(t)=−V'out,max during one complete cycle of V'out(t). The net output voltage Vsum from the peak detector circuits 4 and 5 is obtained by measuring the combined voltage across the commonly grounded capacitors C4 and C5 and will be proportional to the net sum of the maximum positive amplitude +V'out,max and the maximum negative amplitude −V'out,max in any given cycle of V'out(t). As can be seen from FIG. 2C, when no phase difference exists between the fundamental frequency w and second harmonic frequency 2w components of Vout (t), the net output voltage Vsum of the peak detector circuits 4 and 5 will be zero. When a positive phase difference (Ø=+30°) exists, the net output voltage Vsum will be positive. When a negative phase difference (Ø=−30°) exists, the net output voltage Vsum will be negative.

In either case, the net output voltage Vsum of the peak detector circuits 4 and 5 is fed through a variable resistance device R1 such as a potentiometer or a rheostat to the negative input of a conventional operational amplifier 6 that is configured to operate as a summing amplifier. The output of operational amplifier 6 is fed back through a conventional current amplifying transistor 7 to Ls. R1 provides a means for calibrating the input signal Vsum to the operational amplifier 6. The feedback signal provided by operational amplifier 6 is a direct current (DC) signal that is proportional to the net output voltage Vsum of the peak detector circuits 4 and 5. If the net output voltage Vsum is zero (indicating a zero phase difference between the fundamental frequency w and the second harmonic frequency 2w of Vout(t)) then no feedback signal is provided to Ls and as a result no change in the coupling coefficient k between L1 and L2 takes place. If the net output voltage Vsum is positive (indicating a positive phase difference between the fundamental frequency w and the second harmonic frequency 2w of Vout (t)), the feedback signal operates to decrease the amount of current through Ls to adjust the coupling coefficient k to a higher value thereby increasing the extent of electromagnetic coupling between L1 and L2 to eliminate the phase difference. If the net output voltage Vsum is negative (indicating a negative phase difference between the fundamental frequency w and the second harmonic frequency 2w of Vout(t)), the feedback signal operates to increase the amount of current through Ls to adjust the coupling coefficient k to a lower value thereby decreasing the extent of electromagnetic coupling between L1 and L2 to eliminate the phase difference.

Figure 5:
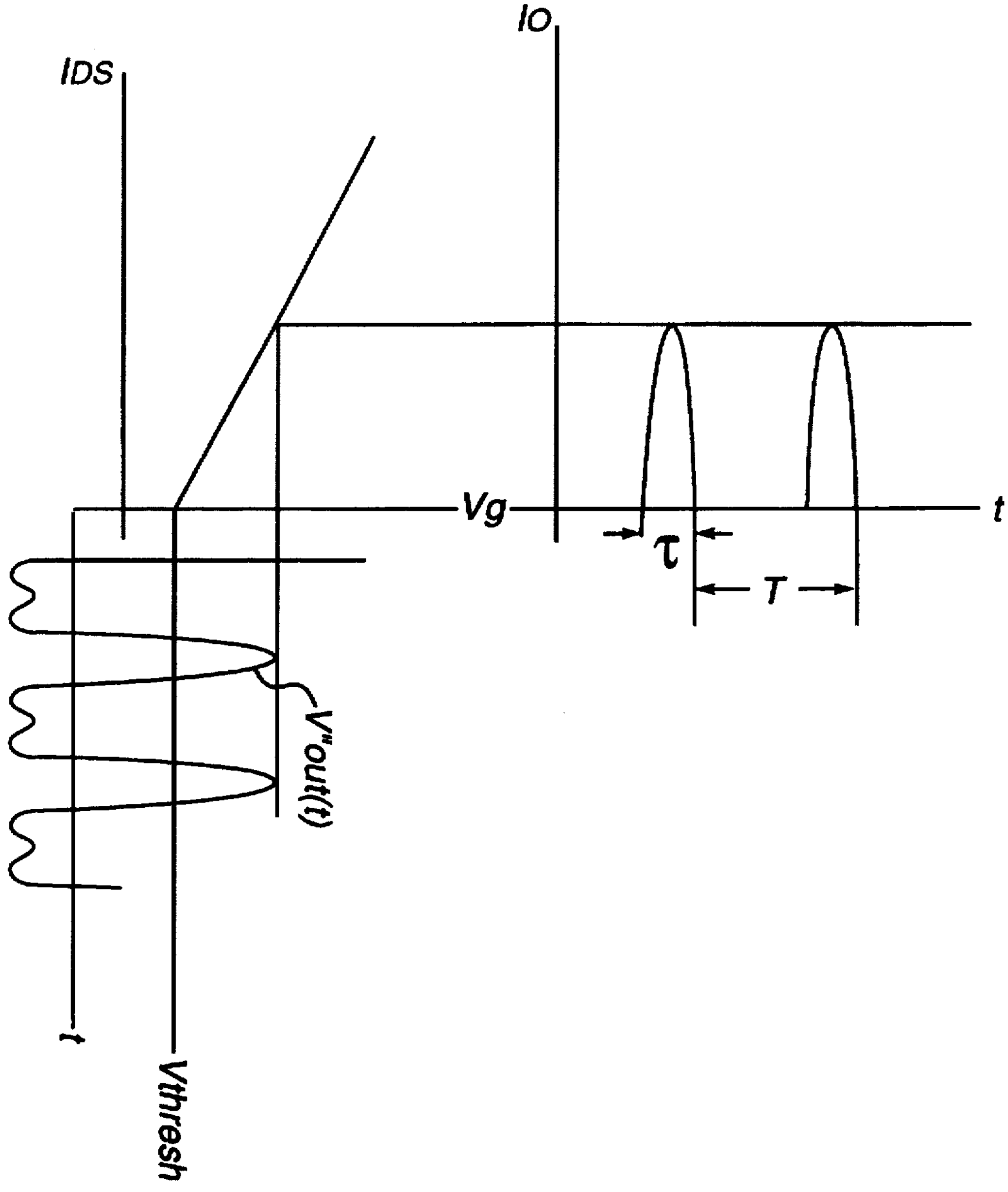
FIG. 5 is a graph of the voltage and current of the power semiconductor controlling input power to the preferred embodiment of the present invention.

In addition to the elimination of phase differences between the fundamental frequency w and second harmonic frequency 2w components, variations in the ratio between the maximum amplitudes Vfund,max and Vharm,max of the fundamental and second harmonic waveforms, respectively, must be eliminated to ensure the closest possible approximation of Vout(t) to the optimum dispersion voltage waveform Vdis(t). These maximum amplitudes Vfund,max and Vharm,max have a ratio that is also initially set by the physical positioning of excitation inductance L0 in relation to L1 and L2 in principal transformer 10. This ratio obeys the following expression:

$$V_{fund,max}/V_{harm,max}=(\sin(a)\cos(2a)-2\sin(a)\cos(2a))/3(a-\sin(a)\cos(a)) \quad (3)$$

where:

$a=(\tau*\pi)/T$ as shown in FIG. 5.

The maximum amplitudes Vfund,max and Vharm,max can be made to vary by adjusting the amount of current I0 passing through excitation inductance L0. The excitation inductance L0 provides input power from voltage source Vcc to excite the tank circuits 1 and 2. The amount of current I0 passing through L0 is controlled by a controller, preferably a power semiconductor 8, which activates to allow L0 to excite the tank circuits 1 and 2 and which deactivates to cut off input power to L0 and the tank circuits 1 and 2. Any conventional power semiconductor can be used for this purpose, such as a power metal-oxide field effect transistor (MOSFET) or a power bipolar-junction transistor (BJT). Power semiconductor 8 is in turn driven by a gating inductance Lf, also housed within principal transformer 10 as shown in FIG. 4, which applies an activating signal V"out(t) between the gate and source of the power semiconductor 8 that mirrors Vout(t).

As shown in FIG. 5, the activating signal V"out(t) controls the period of time during which current I0 passes through excitation inductance L0 by controlling the on-time $\tau$ of the power semiconductor 8. The on-time $\tau$ is in turn controlled by the gating voltage Vg. Gating voltage Vg is an adjustable voltage level that must exceed the intrinsic threshold voltage Vthresh of the power semiconductor 8 in order for the power semiconductor 8 to conduct. Vg is set at a level which will ensure that the on-time $\tau$ of the power semiconductor 8 is within a range that will provide a nearly constant value for the ratio between the maximum amplitudes Vfund,max and Vharm,max of the fundamental w and second harmonic 2w waveforms given in Equation (3).

The activating signal V"out(t) provided by the gating inductance Lf is controlled by the amplitude correction circuit 9 shown in FIG. 1 The amplitude correction circuit 9 contains two cascaded operational amplifiers 14 and 15 that operate in tandem as a differential amplifier having two inputs A and B. The operational amplifier configuration in the amplitude correction circuit 9 can consist of one or more than one conventional operational amplifiers similar to that used in the phase correction circuit 3. The inputs A and B to the amplitude correction circuit 9 are taken from the peak detectors 4 and 5. The voltage +V'out,max across capacitor C4 is provided to one input A while the voltage −V'out,max across capacitor C5 is simultaneously provided to the opposite input B. The difference between these two voltages Vdiff is then compared to a setpoint value Vset which is adjusted by variable resistance device R2 to set the gating voltage Vg of the power semiconductor 8 to the desired level.

As shown in FIGS. 1 and 5, the magnitude of gating voltage Vg relative to the threshold voltage Vthresh of the power semiconductor 8 controls the amount of current Ids passing through the power semiconductor 8 and thus the amount of current I0 passing through excitation inductance L0. If Vg is increased, I0 will increase, causing an increase in the activating signal V"out(t) to the power semiconductor 8. By virtue of the increased current I0 through excitation inductance L0, the amplitudes Vfund,max and Vharm,max of the fundamental w and second harmonic 2w waveforms will have increased. The peak detectors 4 and 5 will detect this increase, causing Vdiff to increase. At the same time, the increase in V"out(t) will cause an increased charging of the capacitance Cf in the gating inductance Lf circuit. This increased charge on Cf will in turn decrease gating voltage Vg, keeping the on-time $\tau$ of power semiconductor 8 and thus the ratio of Vfund,max to Vharm,max essentially unchanged.

Values and models of circuit components used in a preferred embodiment of the invention shown in FIG. 1 are as follows:

TABLE 1

| | |
|---|---|
| C0 | 0.1 μF (microfarads) |
| C2 | 50 pF (picofarads) |
| C3 | 0.01 μF |
| C4 | 1000 pF |
| C5 | 1000 pF |
| C6 | 0.1 μF |
| C7 | 0.2 μF |
| C8 | 0.1 μF |
| C9 | 0.1 μF |
| C10 | 0.1 μF |
| Cf | 0.1 μF |
| R1 | 10 kΩ (kiloohms) |
| R2 | 20 kΩ |
| R3 | 100 kΩ |
| R4 | 10 kΩ |
| R5 | 10 kΩ |
| R6 | 10 kΩ |
| R7 | 750 Ω (ohms) |
| R8 | 100 Ω |
| R9 | 2 kΩ |
| R10 | 100 kΩ |
| R11 | 1 MΩ (megohm) |
| R12 | 1 MΩ |
| R13 | 5 kΩ |

TABLE 1-continued

| | |
|---|---|
| R14 | 1 MΩ |
| R15 | 100 kΩ |
| R16 | 10 kΩ |
| R17 | 1 MΩ |
| D4 | 1N5711 (model number diode) |
| D5 | 1N5711 |
| D6 | 1N4148 |
| Df | 1N4148 |
| L0 | 2 (number of coil turns) |
| L1 | 250 |
| L2 | 250 |
| Ls | 3000 |
| Lf | 1 |
| 6 | LF412A (op amp model no.) |
| 14 | LF412A |
| 15 | LF412A |
| 7 | 2N3904 (BJT model no.) |
| 8 | RFP2N08 (MOSFET model no.) |

While a presently preferred embodiment of practicing the invention has been shown and described with particularity in connection with the accompanying drawings, the invention may otherwise be embodied within the scope of the following claims.

What is claimed is:

1. An electrical circuit for generating a periodically varying electrical signal for creating a periodically varying electrical field between electrodes of an ion mobility spectrometer, comprising:

(A) a first electromagnetic transformer electrically connected to an external power source for converting electrical power input from the external power source to a periodically varying magnetic field;

(B) a controller electrically connected to the first transformer for controlling the electrical power input to the first transformer;

(C) first and second oscillating circuits electromagnetically coupled to each other and to the first transformer for creating the periodically varying electrical field, wherein each oscillating circuit comprises:

(i) an inductance for converting the periodically varying magnetic field to the periodically varying electrical signal; and (ii) a capacitance electrically connected to the inductance for converting the periodically varying electrical signal to the periodically varying electrical field;

wherein the capacitance of one of the oscillating circuits is formed by the electrodes of the ion mobility spectrometer; and wherein the periodically varying electrical signal comprises a first and second frequency component defined by:

(a) the inductances and capacitances which comprise the first and second oscillating circuits; and (b) the extent of the electromagnetic coupling between the inductances which comprise the first and second oscillating circuits.

2. The electrical circuit of claim 1, further comprising a circuit for correcting phase differences between the first frequency component and the second frequency component of the periodically varying electrical signal.

3. The electrical circuit of claim 2, further comprising a circuit for correcting variations in the relative amplitudes of the first frequency component and the second frequency component of the periodically varying electrical signal.

4. The electrical circuit of claim 3, wherein the phase correction circuit comprises:

(A) a second electromagnetic transformer electrically connected to one of the oscillating circuits to input the periodically varying electrical signal to the phase correction circuit;

(B) a pair of electrical circuits electrically connected to the second electromagnetic transformer for converting the periodically varying electrical signal into a pair of voltages for measuring a phase difference between the first frequency component and the second frequency component of the periodically varying electrical signal, wherein:

(i) each voltage is proportional to the time rate of change of the periodically varying electrical signal on an opposite side of a maximum or minimum of the periodically varying electrical signal; and (ii) the sum of the voltages is proportional to the phase difference between the first frequency component and the second frequency component;

wherein each conversion circuit comprises:

(a) a diode for input of a single polarity of the periodically varying electrical signal to the conversion circuit;

(b) a capacitance electrically connected to the diode for converting the periodically varying electrical signal into the voltage wherein both capacitances are electrically connected to a common circuit reference and to a common output impedance;

(c) a first electronic amplifier electrically connected to the common output impedance for amplifying the sum of the voltages for generating an output proportional to the sum; and (d) an inductance electrically connected to the output of the first amplifier for adjusting the extent of the electromagnetic coupling between the oscillating circuits to eliminate the phase difference.

5. The electrical circuit of claim 4, wherein the amplitude correction circuit comprises:

(A) a second electronic amplifier electrically connected to the conversion circuits for comparing the difference between the voltages for generating an output proportional to the difference; and (B) an inductance electrically connected to the output of the second amplifier and to the input of the controller for adjusting the electrical power input to the first transformer to perform the amplitude correction.

6. The electrical circuit of claim 5, wherein the circuit is used to generate a periodic asymmetrical electrical signal for creating a transverse electrical field between the electrodes of the ion mobility spectrometer.

7. The electrical circuit of claim 4, wherein the circuit is used to generate a periodic asymmetrical electrical signal for creating a transverse electrical field between the electrodes of the ion mobility spectrometer.

8. The electrical circuit of claim 4, wherein the second electromagnetic transformer is electrically connected in series to the inductance and the capacitance in the oscillating circuit.

9. The electrical circuit of claim 3, wherein the circuit is used to generate a periodic asymmetrical electrical signal for creating a transverse electrical field between the electrodes of the ion mobility spectrometer.

10. The electrical circuit of claim 2, wherein the circuit is used to generate a periodic asymmetrical electrical signal for creating a transverse electrical field between the electrodes of the ion mobility spectrometer.

11. The electrical circuit of claim 1, wherein the circuit is used to generate a periodic asymmetrical electrical signal for creating a transverse electrical field between the electrodes of the ion mobility spectrometer.

12. The electrical circuit of claim 1, wherein the periodically varying electrical signal is of a substantially square wave shape defined by:

(A) a maximum positive amplitude and a maximum negative amplitude wherein:

(i) the maximum positive amplitude is substantially twice the magnitude of the maximum negative amplitude;

(ii) the electrical signal is at the maximum positive amplitude for substantially one-third of the period;

(iii) the electrical signal is at the maximum negative amplitude for substantially two-thirds of the period; and (iv) the electrical signal alternates between the maximum positive amplitude and the maximum negative amplitude; or (B) a maximum positive amplitude and a maximum negative amplitude wherein:

(i) the maximum negative amplitude is substantially twice the magnitude of the maximum positive amplitude;

(ii) the electrical signal is at the maximum negative amplitude for substantially one-third of the period;

(iii) the electrical signal is at the maximum positive amplitude for substantially two-thirds of the period; and (iv) the electrical signal alternates between the maximum positive amplitude and the maximum negative amplitude.

13. The electrical circuit of claim 12, wherein the second frequency is substantially an integer multiple of the first frequency.

14. The electrical circuit of claim 13, wherein the integer multiple is two.

15. The electrical circuit of claim 12, wherein the circuit is used to generate a periodic asymmetrical electrical signal for creating a transverse electrical field between the electrodes of the ion mobility spectrometer.

16. The electrical circuit of claim 1, wherein the inductance is electrically connected in series to the capacitance.

17. The electrical circuit of claim 1, wherein the controller comprises a power semiconductor.

18. An electromagnetic transformer for generating a periodically oscillating electrical signal comprised of a first frequency signal and a second frequency signal for creating a periodically oscillating electrical field between electrodes of an ion mobility spectrometer, wherein the transformer comprises:

(A) a core having a pair of sections comprised of ferromagnetic material and having a gap of predetermined size between the sections;

(B) a first electrical coil wound around one the section of the core;

(C) a second electrical coil wound around the other section of the core being electromagnetically coupled to the first coil for generating the periodically oscillating electrical signal;

(D) a third electrical coil wound around one section of the core being positioned at differing distances from the first coil and the second coil for electromagnetically exciting the first coil and the second coil; and (E) a fourth electrical coil wound around one section of the core for controlling the amount of electromagnetic excitation provided by the third coil to the first coil and the second coil.

19. The electromagnetic transformer of claim 18, further comprising a fifth electrical coil surrounding a ferrimagnetic material juxtapositioned to the core such that the center of the fifth coil is aligned with the center of the gap in the core for adjusting the extent of electromagnetic coupling between the first electrical coil and the second electrical coil.

20. The electromagnetic transformer of claim 19, wherein the device is used to generate a periodic asymmetrical electrical signal for creating a transverse electrical field between the electrodes of the ion mobility spectrometer.

* * * * *